April 6, 1943.  L. F. CARTER  2,315,500

GYRO VERTICAL

Filed Dec. 6, 1940  2 Sheets-Sheet 1

INVENTOR
LESLIE F. CARTER
BY
Herbert H. Thompson
his ATTORNEY.

April 6, 1943.  L. F. CARTER  2,315,500
GYRO VERTICAL
Filed Dec. 6, 1940  2 Sheets-Sheet 2
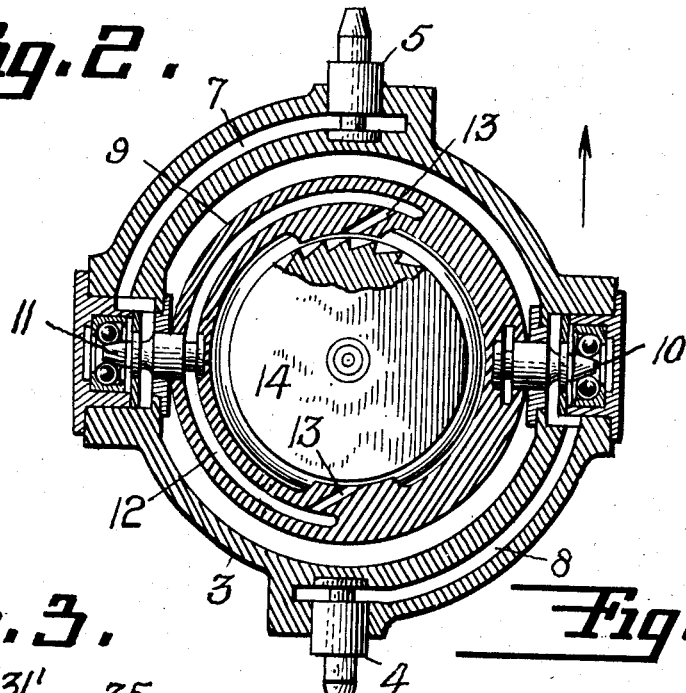
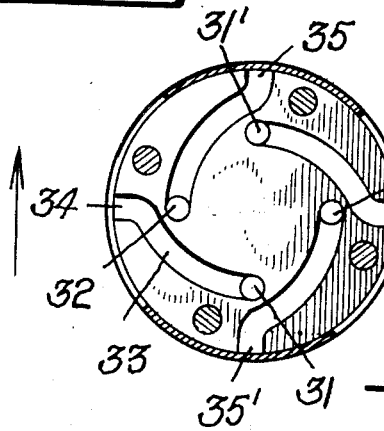
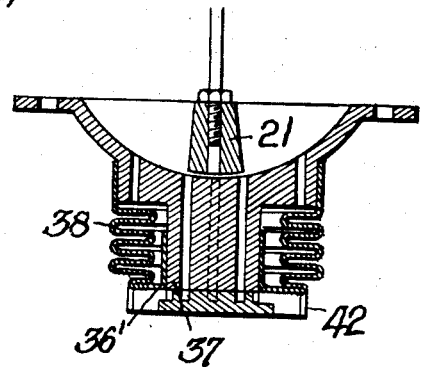
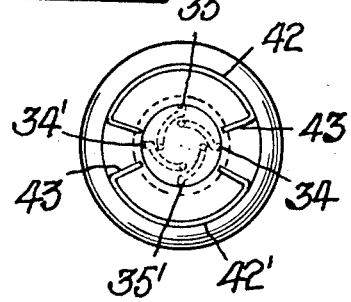
INVENTOR
LESLIE F. CARTER
BY Herbert H. Thompson
his ATTORNEY Patented Apr. 6, 1943

2,315,500

UNITED STATES PATENT OFFICE 2,315,500

GYRO VERTICAL

Leslie F. Carter, Leonia, N. J.

Application December 6, 1940, Serial No. 368,785

9 Claims. (Cl. 74—5)

This application is a continuation in part of application Serial No. 194,039, for Gyro verticals, filed on March 5, 1938, now Patent No. 2,249,744, by present applicant.

This invention relates to the art of gyroscopic artificial horizons or gyro verticals, wherein the purpose is to maintain a truly horizontal plane or reference vertical regardless of acceleration forces due to turning and changes of speed of the vehicle on which the instrument is mounted. More particularly, the invention relates to improvements in the general type of gyroscopic horizon wherein the gyroscope is mounted in substantially neutral equilibrium, and a gravitationally responsive device or devices mounted thereon or associated therewith act to erect the gyroscope by bringing into action upon relative inclination a force substantially normal to the plane of tilt.

Usually such erecting devices, however, cause tilting of the gyroscope during turns or marked changes in speed of the airplane and the principal purpose of this invention is to reduce such errors to a minimum. While I am aware it has been proposed to eliminate entirely all erection forces on a gyroscope during turns, such a solution is not entirely satisfactory since if repeated turns are affected the gyroscope is left without any controlling force and therefore may tilt from the vertical a substantial angle.

According to my invention, I eliminate only the erection force brought into action by the centrifugal force on the controlling pendulum (i. e., the air jet reaction which would otherwise be brought into action by the outswing of the pendulum about the fore and aft axis under centrifugal force), and leave unaffected the erection force controlled by the relative tilt of the pendulum and the gyroscope about the lateral axis of the craft. Preferably, I actually increase the latter force during turns so as to compensate in part for the loss of erecting force about the other axis.

Referring to the drawings showing two forms my invention may assume,

Fig. 2 is a horizontal section of the gimbal ring and gyro casing with outer casing removed taken approximately on line 2—2 of Fig. 1.

Fig. 3 is a detailed transverse section taken substantially on line 3—3 of Fig. 1.

Fig. 4 is a vertical section of the bottom portion of a modified form of gyro vertical.

Fig. 5 is a bottom plan view of the same.

Figure 1:
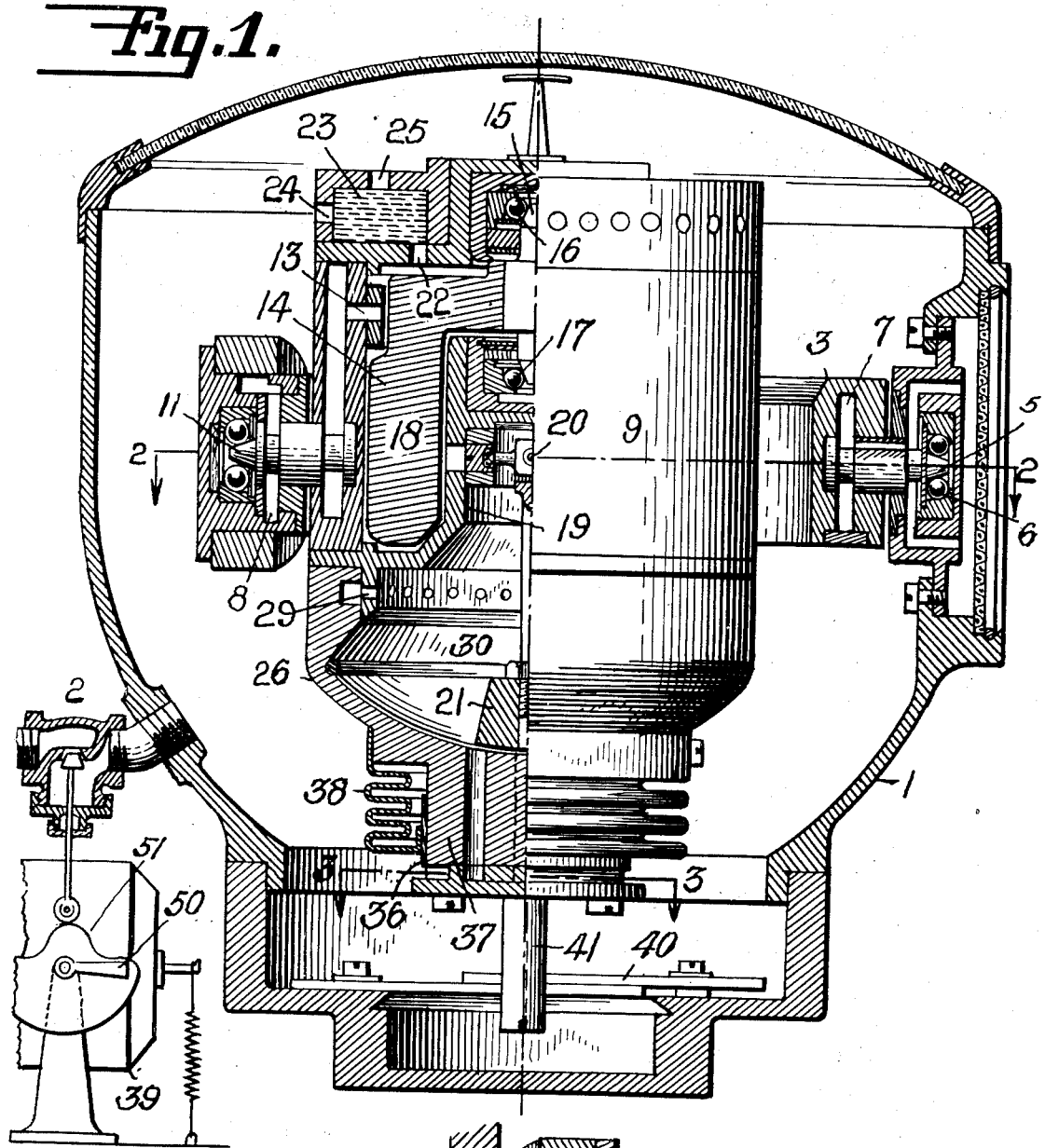
Fig. 1 is a side elevation, partly in section of one of my improved gyro verticals or artificial horizons, the left-hand section, however, being taken 90° to the right-hand side elevation in order to show both pivotal supports.
Figure 6:
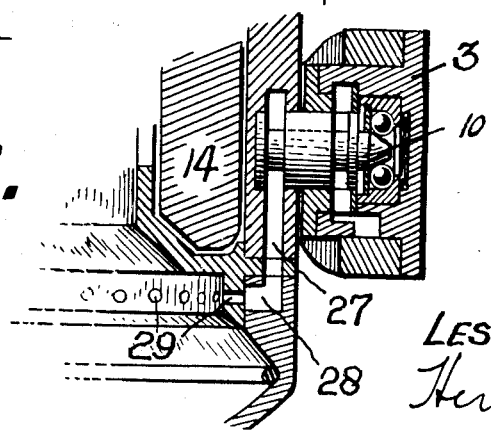
Fig. 6 is a sectional detail through the inner transverse bearing of the gyro case opposite the bearing shown in Fig. 1.

The gyro vertical is shown as universally supported within an outer closed casing 1 from which air is shown as continuously exhausted through adjustable throttle valve 2. Within the casing 1 a gimbal ring 3 is journalled on trunnions 4 and 5 journalled in anti-friction bearings 6 and preferably placed fore and aft on the craft (see arrow in Fig. 2). Preferably both bearings and trunnions are made hollow to admit air under atmospheric pressure and lead it into channels 7 and 8 within the gimbal ring. The rotor bearing casing 9 of the gyroscope is shown as pivoted within the gimbal ring on transverse horizontal trunnions 10 and 11 which, together with their supporting bearings are also made hollow. Trunnion 11 shown as leading air into a passage 12 within the casing 9 to supply the spinning jets 13 to spin the gyro rotor 14. The rotor is shown as of an inverted U-shape in cross section being secured adjacent its top to a short shaft or axle 15 journalled at its top in bearing 16 at the top of the rotor case and journalled at its bottom in bearing 17 located within the downwardly extending rim 18 of the rotor. To this end, the casing is shown as having hollow cylindrical portion 19 projecting up within the rotor to both support said bearing 17 and also to support the universal joint 20 on which the gravitational element or pendulum 21 is pivoted, said joint preferably lying in the same plane as the pivots 4, 5 and 10, 11 which universally support the gyroscope.

Preferably the entire system is made non-pendulous about said universal gimbal pivots. The used air from the rotor is shown as escaping upwardly from the case through apertures 22 thence through baffling means such as loose cotton 23 and thence outwardly through discharge ports 24 and 25. The lower portion 26 of the casing is preferably sealed off from the upper portion and air is led into the same from the hollow trunnion 10 down through passage 27 within the gyro case and into the circular channel 28 and thence through apertures 29 into the chamber 30. Preferably there are four discharge ports 31, 31', 32, 32' from said chamber all normally partially closed to the same extent by a pendulum 21. Each port is in communication through a suitable channel 33 with a laterally directed discharge port 34, 34', 35, 35' arranged to discharge air in such a direction as to exert a torque on the gyroscope at right angles to the plane of tilt. As long as both the gyroscope and pendulum are vertical therefore, no erecting force is exerted thereon but in case of relative tilt a force is exerted to precess the gyro in the shortest path into the vertical.

In order to prevent the disturbing effect of such force during turns I have shown a shutter or spoiler 36 slidably mounted on the exterior of the downward extension 37 of the gyro casing. Said shutter is shown as being secured to one end of a metallic bellows 38 and normally held in its raised position. In case the air pressure within the casing I should be reduced below its normal value, the bellows 38 will expand and lower the shutter to cover preferably only the ports 35 and 35' which are in communication with the pendulum controlled ports 32 and 32' which are positioned athwartship so as to be covered and uncovered by the swing of the pendulum due to turns. Therefore, I leave unaffected the ports 34 and 34' so that these remain effective to maintain the gyroscope erect even during turns.

To cause expansion of the bellows 38, I either open by handle 50 the valve 2 beyond its normal mid-position to increase the vacuum within the casing I or I connect the valve 2 to a rate of turn or turn indicator type of gyroscope 35, which type is well known in the art, and which precesses on turn in one direction or the other to rotate cam 51 and open the valve wider. The cam is so designed that further rotation in either direction by handle 50 will close the valve. Thereby all four ports are rendered ineffectual to erect the gyroscope. A caging means 40 shown at the bottom of the casing is adapted to engage the stem 41 to lock the gyroscope during shipment.

Obviously, my invention is also applicable to a pressure as well as a vacuum system. In the former case, a throttle valve at the pump could be operated as before, by turn gyro or by hand to give maximum pressure when turning. In either case it should be noted that not only is the discharge of air from the ports 35, 35' either stopped or rendered ineffective but also the discharge of air through the other ports 34, 34' is preferably actually increased during a turn. Also, due to the decrease in the total port area by substantially half, a relatively greater volume of air is then made available for discharge through ports 34 and 34'. The slight decrease in pressure required within the case I to effect expansion of the bellows 38 is then effective to increase the rate of flow of the air through the available ports 34 and 34'. Since the latter ports are not affected by the acceleration forces of the turn, this effect rather improves the operation of the gyroscope than otherwise since it tends to compensate for loss of erection force from the other two ports.

In the modification shown in Figs. 4 and 5 instead of actually closing the outlet from the discharge ports, I merely spoil their jet action by providing a shutter which intercepts the jets discharged therefrom near the point of discharge. In this way, reaction from the air jets is prevented. As shown in Fig. 4 the bellows 38 may be constructed as before but the shutter 36' instead of closely covering the discharge ports is made with a rim of somewhat greater diameter than the bottom of the extension 37, this rim being shown as having two spaced downwardly extending portions 42 and 42' with their ends bent inwardly at 43 and 43' shown in Fig. 5. Therefore, when the bellows 38 is in its expanded position as shown in Fig. 4, the rims 42 and 42' engage the jets discharged from the ports 35 and 35' to spoil their lateral reaction by deflecting the discharged air downwardly, while the jets from the other ports 34 and 34' remain unintercepted and unaffected. Thus, it is obvious that my invention is not limited to air spun or air erected gyroscopes but that the broad principles thereof may be applied to any form of gyro vertical in which erection is maintained by gravitationally controlled forces which exert torque substantially at right angles to the relative tilt of the gyroscope and gravitational element.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an instrument for aircraft, a gyro vertical having fore and aft and lateral axes of support, pneumatically effective means controlled by gravitationally responsive means for normally causing a torque to be exerted about either of said axes responsive to relative tilt of the gyro vertical and the gravitationally responsive means about the other axis, and selective means responsive to turning movements of the aircraft for spoiling only said normally exerted pneumatically effective torque causing means about the lateral axis of support of the gyro vertical.

2. An aircraft instrument, as claimed in claim 1, in which the gravitationally responsive means is a pendulum and the pneumatically effective torque causing means controlled by the same includes a group of two cooperating pairs of ports in the gyro vertical through which air is differentially discharged under control of the pendulum.

3. An aircraft gyro vertical having fore and aft and lateral axes of support, cooperative pairs of laterally facing and fore and aft facing ports therein by means of which the gyro vertical is pneumatically erected, gravitationally responsive means adjacent each port for controlling its opening, and means including a shutter for closing only the cooperative fore and aft facing ports during turns of the aircraft.

4. An aircraft gyro vertical having fore and aft and lateral axes of support, cooperative pairs of laterally facing and fore and aft facing ports therein by means of which the gyro vertical is pneumatically erected, gravitationally responsive means adjacent each port for controlling its opening, a movable spoiler for the air jets issuing from at least one of the cooperative pairs of said ports, and means for moving said spoiler into and out of its operative position.

5. An aircraft instrument, as claimed in claim 1, in which the degree of exertive torque about the fore and aft axes of support of the gyro vertical by said pneumatically effective torque causing means is increased when said last named means therein is operative.

6. An aircraft gyro vertical having fore and aft and lateral axes of support, laterally facing and fore and aft facing ports therein by means of which the gyro vertical is pneumatically erected, gravitationally responsive means adjacent each port for controlling the same, a variable air supply for said ports, shutter means for closing only the fore and aft facing ports during turns, and means for operating said shutter during turns of the aircraft and thereby simultaneously increasing the available air supply for the other ports.

7. In a gyroscopic instrument for a craft, the combination of, a gyro rotor bearing case having fore and aft and laterally defined axes of support with respect to the craft, pneumatically effective means controlled by gravitationally responsive means mounted on said case for normally causing a torque to be exerted about either of said axes responsive to relative tilt of the case and the gravitationally responsive means about the other axis, means on said case operative to eliminate the normally exerted torque about only one of said axes, and means responsive to turning of the craft for controlling said last named means.

8. An instrument as claimed in claim 7, in which said one axis is the lateral axis.

9. An instrument as claimed in claim 7, in which said one axis is the lateral axis and in which said torque eliminating means operates to facilitate an increase in the torque exerted by said torque causing means about the fore and aft axis.

LESLIE F. CARTER.